US008771772B2

(12) United States Patent
Damodaran

(10) Patent No.: US 8,771,772 B2
(45) Date of Patent: Jul. 8, 2014

(54) METHOD TO SEPARATE LIPIDS FROM CHEESE WHEY

(71) Applicant: Wisconsin Alumni Research Foundation, Madison, WI (US)

(72) Inventor: Srinivasan Damodaran, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 13/956,761

(22) Filed: Aug. 1, 2013

(65) Prior Publication Data

US 2013/0316052 A1 Nov. 28, 2013

Related U.S. Application Data

(60) Division of application No. 13/739,501, filed on Jan. 11, 2013, which is a continuation of application No. 12/247,324, filed on Oct. 8, 2008, now Pat. No. 8,431,174.

(51) Int. Cl.
*A23C 9/146* (2006.01)
(52) U.S. Cl.
USPC ........... 426/271; 426/583; 426/601; 426/608; 426/491
(58) Field of Classification Search
USPC .......................... 426/271, 583, 601, 608, 491
See application file for complete search history.

(56) References Cited

U.S. PATENT DOCUMENTS

| 3,560,219 | A | | 2/1971 | Attebery |
| 3,864,506 | A | | 2/1975 | Grindstaff et al. |
| 4,559,233 | A | | 12/1985 | Chen et al. |
| 4,897,279 | A | | 1/1990 | Lehmann et al. |
| 5,185,166 | A | * | 2/1993 | Nakagawa et al. ............. 426/74 |
| 5,436,014 | A | | 7/1995 | Damodaran |
| 5,958,477 | A | * | 9/1999 | Muromachi et al. ............ 426/74 |
| 8,431,174 | B2 | | 4/2013 | Damodaran |

OTHER PUBLICATIONS

Cerbulis et al. Journal Dairy Science 1986 69:2604-2607.*
Auge, N., Andrieu, N., Negresalvayre, A., Thiers, J.C., Levade, T., and Salvayre, R. (1996), The sphingomyelin-ceramide signaling pathway is involved in oxidized low-density lipprotein-induced cell proliferation. *J. Biol. Chem.* 271:19251-19255.
Bock, C.W., Katz, A.K., and Glusker, J.P. (1995), Hydration of zinc ions: A comparison with magnesium and beryllium ions. *J. Am. Chem. Soc.* 117:3754-3765.
Bock, C.W., Katz, A.K., Markham, G.D., and Glusker, J.P. (1999), *J. Am. Chem. Soc.* 121:7360-7372.
Breslau, B.R., Goulet, J. and Cross, R.A. (1975), Production of a crystal clear, bland tasting protein solution from cheese whey. *Cultured Dairy Prod. J.* 10:13-14.

(Continued)

*Primary Examiner* — Anthony Weier
(74) *Attorney, Agent, or Firm* — Daniel A. Blasiole; Joseph T. Leone, Esq.; DeWitt Ross & Stevens SC

(57) ABSTRACT

Shown is a method of selectively separating milk fat globule membrane fragments and milk fat globules from whey. The method includes the steps of adding to whey an amount of a whey-soluble zinc salt and adjusting the pH of the whey to be less than 6.0. The amount of zinc salt added to the whey is sufficient to cause milk fat globule membrane fragments and milk fat globules contained in the whey to precipitate selectively from the whey.

15 Claims, 14 Drawing Sheets

(56) References Cited

OTHER PUBLICATIONS

Carunchia Whetstine, M. E., Drake, M. A. and Croissant, A. (2004), Characterization of dried whey protein concentrate and isolate flavor. *J. Dairy Sci.* 88:3826-3839.

Chandan et al., *Dairy Ingredients for Food Processing*, 2011, Table 8.2.

Chen, C.S., Rosenwald, A.G., and Pagano, R.E. (1995), Ceramide as a modulator of endocytosis. *J. Biol. Chem.* 270:13291-13297.

Chmura, S.J., Nodzenski, E., Weichselbaum, R.R., and Quintans, J. (1996), Protein kinase C inhibition induces apoptosis and ceramide production through activation of a neutral sphingomyelinase. *Cancer Res.* 56:2711-2714.

Dewettinck et al, (2008) *International Dairy Journal*, Issue 18, pp. 436-457.

Diaz et al., (2004), *Food Hydrocolloids*, vol. 18, pp. 601-610.

Dyatlovitskaya, E.V. (1995), Sphingolipids and malignant growth. *Biochemistry* (Moscow) 60:629-633.

Fong, B.Y., Norris, C.S., and MacGibbon, A.K.H. (2007), Protein and lipid composition of bovine milk-fat-globule membrane. *Int. Dairy J.* 17:275-288.

Hirmo et al., (1998), Inhibition of Helicobacter pylori sialic acid-specific haemagglutination by human gastrointestinal mucins and milk glycoproteins, *FEMS Immunology and Medical Microbiology*, 20:275-281.

Holt, C., et al., (1999), Some physico-chemical properties of nine commercial or semi-commercial whey protein concentrates, isolates and fractions. *Int. J Food Sc. Technol.* 34:587-601.

Hwang, D. and Damodaran, S. (1995), Selective precipitation of fat globule membrane from cheese whey using chitosan. *J. Agric Food Chem.* 43, 33-37.

Gulsker, J.P., Katz, A.K., and Bock, C.W. (1999), Metal ions in biological systems. *The Rigaku J.* 16:8-16.

Jayadev, S., Liu, B., Bielawska, A.E., Lee, J.Y., Nazaire, F., Pushkareva, M.Y., Obeid, L.M., and Hannun, Y.A. (1995), *J. Biol. Chem.* 270:2047-2052.

Kanno, C. (1990), Secretory membranes of the lactating mammary gland. *Protoplasma* 159:184-208.

Laemmli, U.K. (1970), Cleavage of structural proteins during the assembly of the head of bacteriophage $T_4$. *Nature* 227:680-685.

Lin Teng Shee, Fabrice, et al., "Precipitation of Cheddar Cheese Whey Lipids by Electrochemical Acidification," J Agric Food Chem 2005, 53, 5635-5639.

Mana, P., Goodyear, M., Bernard, C., Atomioka, R., Freire-Garabal, M., and Linares, D. (2004), Tolerance induction by molecular mimicry: Prevention and suppression of experimental autoimmune encephalomyelitis with the milk protein butyrophilin. *Int. Immunol.* 16:489-499.

Mather, I.H. (2000), A review and proposed nomenclature for major proteins of the milk-fat globule membrane. *J. Dairy Sci.* 83:203-247.

Maubois, J.L., Pierre, A., Fauquant, J., and Piot, M. (1987), Industrial fractionation of main whey proteins. *Int. Dairy Fed. Bull.* 212:154-159.

McDaniel, M.A., Maier, S.F., and Einstein, G.O. (2003), "Brain-specific" nutrients: A memory cure? *Nutrition* 19:955-956.

Morr, C. V. and Ha, E. Y. W. (1991), Off-flavors of whey protein concentrates: a literature review. *Int. Dairy J.* 1:1-11.

Newlander, J.A., and Atherton, H.V. (1977), Babcock, Gerber, Mohonnier tests for fat. In *The Chemistry and Testing of Dairy Products*; AVI Publishing: Westport, CT, 1977; p. 103.

Obeid, L.M. and Hannun, Y.A. (1995), Ceramide—a stress signal and mediator of growth suppresion and apoptosis. *J. Cell. Biochem.* 58:191-198.

Oshida, K., Shimizy, T., Takase, M., Tamura, Y., Shimizu, T., and Yamashiro, Y. (2003), Effect of dietary sphingomyelin on central nervous system myelination in developing rats. *Pediatr. Res.* 53:580-592.

Rinn, J.-C., Morr, C. V., Seo, A., and Surak, J. G. (1990), Evaluation of nine semi-pilot scale whey pretreatment modifications for producing whey protein concentrate. *J. Food Sci.*, 55, 510-515.

Rombaut et al., (2007), *Journal of Dairy Science*, vol. 90, pp. 1662-1673.

Rosenberti, (1995), *Trends in Food Science and Technology*, vol. 6, pp. 12-19.

Sasaki, T., Hazeki, K., Hazeki, O., and UL-M Katada, T. (1995), Permissive effect of ceramide on growth factor-induced cell-proliferation. *Biochem. J.* 311:829-834.

Spitsberg, V.L., Matitashvili, E., and Gorewit, R.C. (1995), Association of fatty acid binding protein and glycoprotein CD36 in the bovine mammary gland. *Eur. J. Biochem.* 230:872-878.

Spitsberg, V.L. and Gorewit, R.C. (1997), Anti-cancer proteins found in milk. *CALS News*, vol. 3(5). Cornell University, Ithaca, NY.

Spitsberg, V.L. (2005), Invited review: Bovine milk fat globule membrane as a potential nutraceutical. *J. Dairy Sci.* 88: 2289-2294.

St-Gelais, Daniel, et al., "Combined Effects of Temperature, Acidification, and Diafiltration on Composition of Skim Milk Retentate and Permeate," 1992 J Dairy Sci 75:1167-1172.

Vaghela, M. and Kilara, A. (1996), Lipid composition of whey protein concentrates manufactured commercially and in the laboratory. *J. Dairy Sci.* 79:1171-1183.

Venable, M.E., Lee, J.L., Smyth, M.J., Bielawska, A., and Obeid, L.M. (1995), Role of ceramide in cellular senescence. *J. Biol. Chem.* 270:30701-39708.

Vesper, H., Schmelz, E.-M., Nikolova-Karakashian, M.N., Dillehay, D.L., Lynch, D.V., Merrill, A.H. Jr., (1999), Sphingolipids in food and the emerging importance of sphingolipids to nutrition. *J. Nutr.* 129:1239-1250.

Wang, X., Hirmo, S., Millen, R., and Wadstrom, T. (2001), Inhibition of *Helicobacter pylori* infection by bovine milk glycoconjugates in a BALB/cA mouse model. *FEMS Immunol. Med. Microbiol.* 20:275-281.

Wright, S.C., Zheng, H., and Zhong, J. (1996), Tumor-cell resistance to apoptosis due to a defect in the activation of sphingomyelinase and the 24 kDa apoptotic protease (Ap24). *FASEB Journal* 10:325-332.

\* cited by examiner

Accelerated Storage testing of Powders (45-50°C, 3 months)

| Commercial WPC80 | | Chitosan treated WPC80 | |
|---|---|---|---|
| Before | After | Before | After |

METHOD TO SEPARATE LIPIDS FROM CHEESE WHEY

CROSS-REFERENCE TO RELATED APPLICATIONS

This application is a divisional of U.S. patent application Ser. No. 13/739,501, filed Jan. 11, 2013, which is a continuation of U.S. patent application Ser. No. 12/247,324, filed Oct. 8, 2008, issued Apr. 30, 2013, as U.S. Pat. No. 8,431,174, all of which are incorporated herein by reference.

STATEMENT REGARDING FEDERALLY FUNDED RESEARCH

This invention was made with government support under 2006-35503-16998 awarded by the USDA/NIFA. The government has certain rights in the invention.

FIELD OF THE INVENTION

The invention is directed to a method to separate lipids from cheese whey selectively, and to the resulting product so formed.

BIBLIOGRAPHY

Full citations of the references cited herein are included in a bibliography section immediately preceding the claims. All of the references cited in the bibliography are incorporated herein by reference.

BACKGROUND

Annual production of cheese whey in the United States was approximately 80 billion pounds in 2006 (U.S. Department of Agriculture, National Agricultural Statistics Service, Washington, D.C.). This by-product of the cheese industry was once regarded as a waste effluent and was used as cattle feed and spread on land. Whey, however, has enormous potential not only as a source of nutritionally exceptional food proteins, but as a rich source of pharmacological, immunological, antibacterial, and bioactive agents. Shown in FIG. 1 is the list of various high value functional proteins and bioactive components that can be isolated in large quantities from cheese whey.

With the advent of ultrafiltration in the late 1970's, a significant portion of whey is now converted into whey protein concentrates. Whey protein concentrate 80 (WPC80, 80% protein on a dry basis) is manufactured by extensive ultrafiltration and diafiltration of crude whey to reduce the non-protein components, especially the lactose content. WPC80 is a homogeneous, free-flowing powder. WPC80 has become a popular protein ingredient because it contains highly nutritive proteins, it is soluble over a wide pH range, and has good gelling, and water-binding characteristics. It is used in dairy, bakery, meat, snacks, confectionery, infant formulae, and other food and nutritional products. It has the potential for use in sports nutrition, energy bars, low carbohydrate diet formulae, yogurt, ice cream, and dry mixes.

Commercial WPC80 typically contains 80 to 82% protein, 4 to 8% lactose, 4 to 8% fat, 3 to 4% ash, and 3.5 to 4.5% moisture. Commercial WPC80 exhibits a wide variation in functional properties even from the same processing plant (Holt et al., 1999). Although most WPC products are generally tasteless immediately after production, they develop a typically stale, oxidized off-flavor during storage. The off-flavor is due to a series of complex, inter-related chemical reactions that include lipid oxidation and Maillard browning (Morr & Ha, 1991). The development of the off-flavor during storage is one of the factors that limit more extensive use of WPC80 in various food products (Carunchia Whetstine et al., 2005).

Most of the quality defects, such as discoloration, off-flavor development, poor solubility, turbidity, poor foaming and emulsifying properties, etc., that arise during storage of WPC80 can be traced back to its high lipid content. The residual lipid fraction in WPC80 comes from fragments of milk fat globule membrane (MFGM) and very tiny intact fat globules (Vaghela and Kilara, 1996). These small, stable colloidal particles remain in the whey after clarification. The lipid content of isolated MFGM is about 72% and the phospholipid content is about 30% of the total lipids found in whey (Fong et al., 2007). The MFGM fragments are concentrated and retained with the protein during manufacture of WPC80 using ultrafiltration and diafiltration processes. During ultrafiltration, the MFGM fragments foul the ultrafiltration membrane elements. The fouling significantly decreases the permeate flux rate and increases the frequency of equipment cleaning cycles. This, in turn, increases in energy cost to produce WPC80. In the final product, the lipids and phospholipids impart turbidity when the WPC80 powder is reconstituted into solution. This is a highly undesirable quality in protein drink-type products. Lipids and phospholipids also impair the foaming and emulsifying properties of WPC80.

More importantly, oxidation of the MFGM lipids during storage of WPC80 results in the development of off-flavors. Some of these off-flavor compounds are aldehydes and ketones, which undergo carbonyl-amine reactions with amino groups of proteins. These chemical changes cause discoloration in the WPC80 powder and adversely affect the functional properties of whey proteins, e.g., foaming, emulsification, gelation, solubility, and turbidity (Vaghela and Kilara, 1996). All of these undesirable changes in WPC during storage limit its usefulness in a variety of food products.

Several methods have been reported in the past to remove lipids from cheese whey (Breslau et al., 1975; Grindstaff & Ahern, 1975; Maubois, et al., 1987; Lehmann & Wasen 1990; Rinn et al., 1990). The efficacy of these methods have been reviewed (Mon & Ha, 1991). However, most of these methods cause complete denaturation and insolubilization of whey proteins. Denaturation and insolubilization impair most of the functional properties of the proteins. See also U.S. Pat. No. 3,560,219, issued Feb. 2, 1971, to Attebery. In this approach, the whey is treated by adjusting its pH to a value of above 6 (preferably from 7.0 to 7.5) and adding a divalent metal ion to a concentration of at least 0.075 molal.

In an earlier attempt to address the longstanding issue of quality defects caused by MFGM lipids in WPC80, the present inventor had previously developed a simple process to flocculate MFGM using colloidal chemical principles. The colloidal stability of MFGM in cheddar cheese whey (and other types of cheese whey) is due primarily to their highly negatively charged surface. Neutralization of these negative charges under specific conditions using a poly-cationic polymer can induce flocculation of MFGM fragments. In previous work co-authored by the present inventor, it was shown that chitosan (a poly-glucosamine polymer) selectively binds to and causes flocculation of MFGM fragments. (See U.S. Pat. No. 5,436,014, issued Jul. 25, 1995, to Damodaran). According to this method, adding about 0.01% (w/v) chitosan using a stock solution containing 1% chitosan in 10% acetic acid to cheddar cheese whey at pH 4.5 resulted in the formation of a chitosan-MFGM complex. Upon incubation for 30 min at 25°

C., the complex flocculated and precipitated. The precipitate could then be removed by centrifugation. The resulting clarified whey was crystal clear in appearance and contained almost all the whey proteins, including IgG. The clarified whey also had a fat content of less than 0.26 g/100 g protein. This chitosan process can be carried out with 5-fold concentrated whey.

The chitosan process completely removes lipids from cheese whey, allowing efficient processing of the crystal clear whey into fat-free WPC and WPI. The WPC80 obtained using the chitosan process is very stable against discoloration during storage compared to commercial WPC80, as shown in FIG. 2. This also categorically confirms that oxidation of MFGM lipids and a series of reaction of the resulting carbonyl compounds with amino groups of proteins through the Maillard reaction is the principal cause of discoloration and off-flavor development in WPC during storage.

Although the chitosan process is simple and produces highly functional WPC and WPI, whey processors are unable to use this technology in the United States because chitosan is not yet approved as a "GRAS" (generally regarded as safe) substance in the U.S. (although chitosan has GRAS status in Europe and Japan). Furthermore, recovery of MFGM from the chitosan-MFGM complex is not effective under mild conditions. Thus, there is still a long-felt and unmet need to develop a simple process to remove MFGM from cheese whey, thereby enabling cost-effective and energy-efficient production of high quality WPC80 and WPI. The unmet need is two-fold: (1) to reduce filter fouling by MFGM lipids, thereby decreasing the cost of whey protein production; and (2) to remove or to decrease significantly the concentration of MFGM lipids in the final whey protein concentrate product, thereby limiting off-flavor formation and discoloration of the whey protein concentrate.

SUMMARY OF THE INVENTION

The above-noted long-felt and unmet needs in the whey protein production industry are met in the present invention via a process for removing fat selectively from crude whey and processed whey protein products. The resulting product is almost fat-free, yet retains the beneficial nutritive value and functional properties of WPC80. The process also yields a whey protein concentrate product that retains its flavor quality and color during long storage periods. The invention is thus a process to remove fat in general and MFGM in particular from whey, selectively. The process is preferably implemented prior to ultrafiltration or diafiltration. The method functions to remove all or substantially all lipids and MFGM lipids from crude whey. In this fashion, these lipids are no longer present in the whey at the time it is subjected to ultrafiltration and/or diafiltration. Thus, the lipids do not foul the filtration membranes. The method of the present invention is highly efficient, economical, and easily implemented using existing whey-processing equipment. Moreover, the isolated lipids themselves contain bioactive components. Thus, the lipid component removed from the crude whey is also a value-added product that can be further processed or sold into markets distinct from the WPC80 and WPI markets.

Although the presence of MFGM in cheese whey adversely impacts the quality of WPC, it has been shown that the MFGM contains several bioactive lipids and protein components (see FIG. 1). (Spitsberg, 2005; Vesper et al., 1999.) For instance, the fatty acid binding protein (FABP) found in MFGM has been shown to inhibit the growth of some breast cancer cell lines at extremely low concentration (Spitsberg et al., 1995; Spitsberg and Gorewit, 1997), suggesting that MFGM has the potential as a natural functional food supplement for preventing the development of breast cancer. Butyrophilin is one of the major proteins (~40% of total proteins) of bovine MFGM. It is a trans-membrane protein with the exoplasmic N-terminal domain belonging to the immunoglobulin (Ig) superfamily (Mather, 2000). The presence of extracellular Ig(V)-like domain in butyrophilin has been implicated in its ability to suppress multiple sclerosis (Mana et al., 2004). Other protein components of MFGM, especially glycoproteins, have been shown to inhibit *Helicobacter pylori* infection of the stomach mucosa in the BALB/cA mice (Wang et al., 2001). In addition, xanthine oxidase, which constitutes 13% of the total proteins of MFGM, is a potent antimicrobial agent. The identities of various proteins and enzymes isolated from MFGM have been recently published (Fong et al., 2007).

In addition to bioactive proteins and enzymes, MFGM contains several bioactive phospholipids. The lipid content of isolated MFGM is about 72% and the phospholipid content of MFGM is about 30% of the total lipids. The phospholipids fraction is comprised of about 19-23% sphingomyelin, 25-40% phosphatidyl choline and 27-35% phosphatidyl ethanolamine, on a weight basis (Kanno, 1990; Fong et al., 2007). Several recent studies have indicated that consumption of phospholipids, including those derived from milk, affect cell growth and development, memory, stress, development of Alzheimer's disease, and brain development in infants (McDaniel et al., 2003; Oshida, et al. 2003; Vesper et al., 1999). An emerging body of knowledge suggests that sphingomyelin and its hydrolysis products ceramide and sphingosine are highly bioactive compounds that are involved in a pathway known as the "sphingomyelin cycle" or "ceramide signaling." These cycles are thought to coordinate a multitude of cell regulation processes, ranging from cell proliferation/differentiation (Sasaki et al., 1995; Auge et al., 1996) to inhibition of cell growth (Obeid and Hannun, 1995) and apoptosis (Chen et al., 1995; Chmura et al., 1996; Venable et al., 1995; Jayadev et al., 1995; Vesper et al., 1999). The involvement of ceramide in apoptosis has generated much interest in the possibility of using it in cancer treatments (Dyatlovitskaya, 1995). Recent evidence suggest that the uncontrolled growth of certain tumor cells might be due in part to a defect in the sphingomyelin cycle (Wright et al., 1996).

It is evident from the above discussions that while the presence of MFGM in cheese whey creates problems both during manufacture and storage of WPC80, the MFGM is an excellent source of several bioactive lipids and proteins, which can be potentially used as a functional food. Currently, egg yolk and soybean are the main sources of food-grade lecithin available for the food industry. The food industry, however, is desperately searching for an alternative source of lecithin to cater the needs of the segment of the population who are allergic to egg and soybean products. The present invention addresses this need by providing a simple, economical process that simultaneously separates MFGM (with its bioactive components intact) from crude whey, and yields a crystal clear whey stream containing the vast majority of whey proteins. The MFGM fraction can be further processed to yield various bioactive compounds. The whey stream can be efficiently processed into a fat-free WPC80 with good flavor stability, visual stability, and functional properties. The present invention also reduces the energy use in whey processing and expands the utilization of whey proteins in numerous food products.

Thus, the invention is directed to a method of selectively separating milk fat globule membrane fragments and milk fat globules from whey. The method comprises adding to whey an amount of a whey-soluble zinc salt and adjusting pH of the whey to be less than 6.0. The amount of zinc salt added to the whey is sufficient to cause milk fat globule membrane fragments and milk fat globules contained in the whey to precipitate from the whey.

As noted below, any whey-soluble zinc salt, not toxic to humans, can be used in the invention. These zinc salts include zinc halides, zinc sulphates, zinc bisulfates, zinc phosphates, zinc tosylates, zinc nitrates, zinc sulphamates, zinc acetates, zinc citrates, zinc lactates, zinc tartrates, zinc gluconates, zinc malonates, zinc oxalates, zinc salicylates, zinc propionates, zinc succinates, zinc fumarates, zinc maleates, zinc valerates, zinc oleates, zinc palmitates, zinc stearates, zinc laurates, zinc borates, zinc benzoates, zinc naphthylate, zinc mesylate, zinc glucoheptonate, zinc lactiobionate, zinc methylene-bis-b-hydroxynaphthoates, zinc gentisates, zinc isethionates, zinc di-p-toluoyltartrates, zinc alkylsulphonates, zinc benzenesulphonates, zinc p-toluenesulphonates, zinc cyclohexylsulphamates, and zinc quinates. Zinc chloride, zinc acetate, and zinc gluconate are the preferred salts.

The preferred pH of the whey is less than 6, more preferably between about 3.5 and about 5, more preferably between about 4.0 and about 5.0, and most preferably between about 4.2 and about 4.8. The amount of a whey-soluble zinc salt added to the whey generally is enough to yield a concentration of $Zn^{+2}$ in the whey of from about 0.01 molal to about 0.05 molal, although concentrations above and below this range are within the scope of the invention.

The process is preferably carried out at room temperature or slightly elevated, preferably from about 15° C. to about 50° C., and more preferably from about 30° C. to about 40° C.

Another version of the invention is directed to a method of selectively separating milk fat globule membrane fragments and milk fat globules from whey. In this version of the invention, the method comprises concentrating whey and then diafiltering the whey to yield a filtrate and a retentate having a conductivity of about 9600/cm or less. It is preferred that the rententate be diafiltered until the retentate has a conductivity of about 4800/cm or less. The pH of the retentate is then adjusted to be less than about 6.0, which causes milk fat globule membrane fragments and milk fat globules contained in the retentate to precipitate selectively from the retentate.

It is preferred that the whey be concentrated from about 3× to about 8×. Concentration ranges above and below this stated range are within the scope of the invention.

When adjusting the pH of the retentate to below 6, it is preferred that the pH of the retentate be adjusted to be between about 3.5 and about 5, and more preferred to be between about 4.0 and about 5.0, and most preferred to be between about 4.0 and about 4.2.

DETAILED DESCRIPTION

Figure 1:
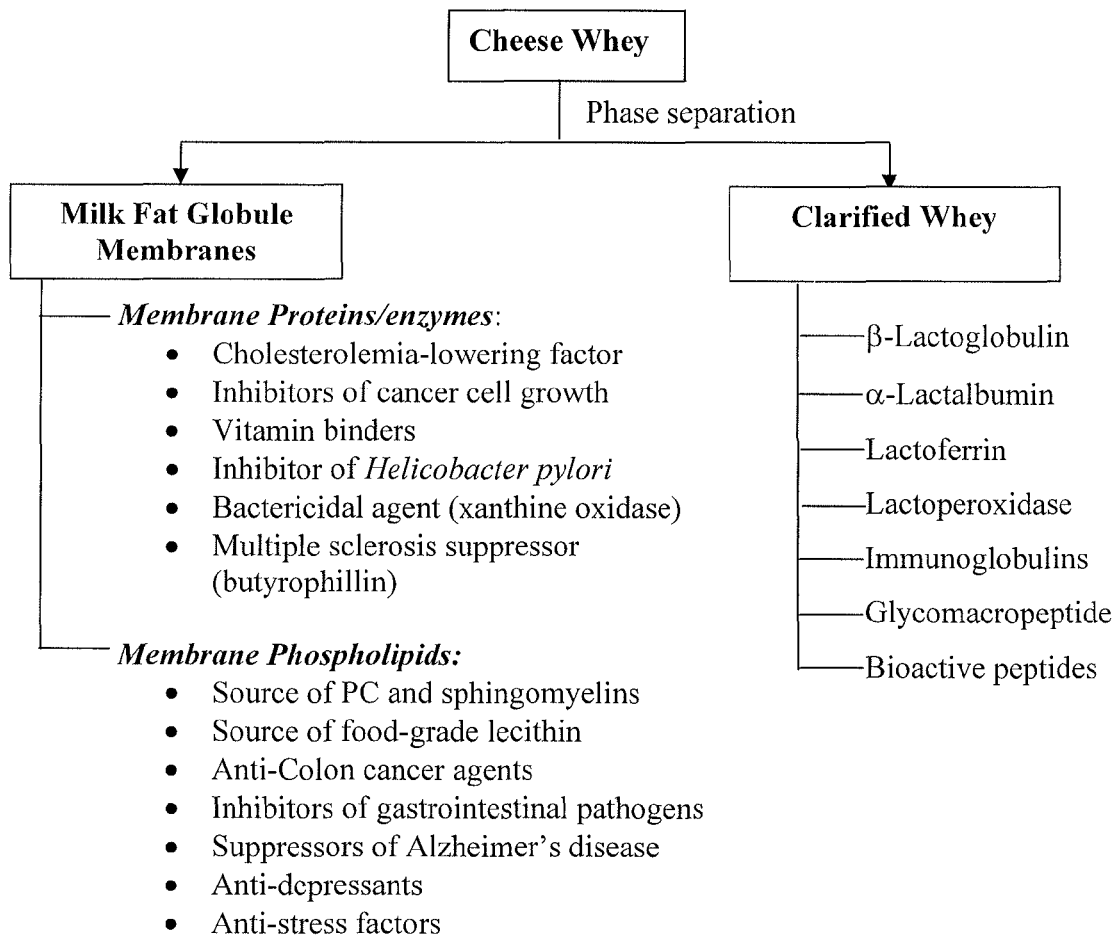
FIG. 1 is a table depicting the high value food, pharmacological, immunological, and bioactive components contained in cheese whey.
Figure 2:
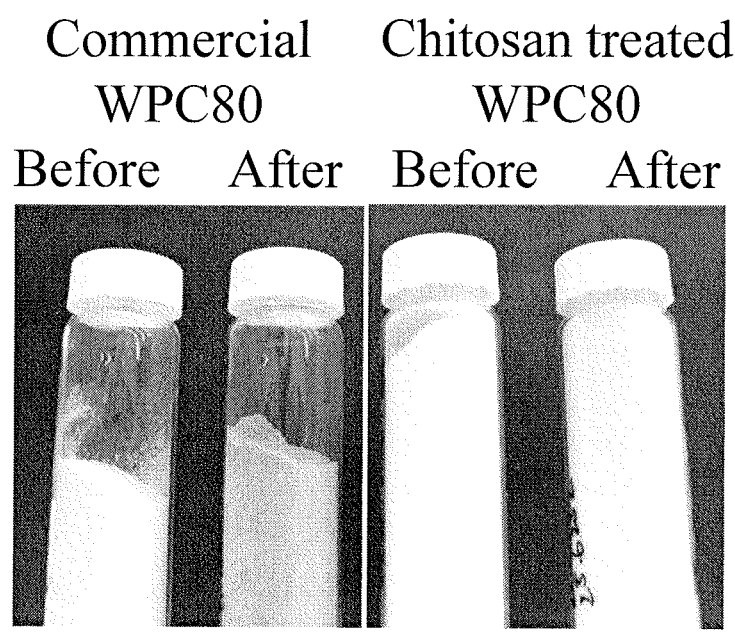
FIG. 2 is a pair of photographs comparing the storage stability (discoloration) of a WPC80 sample produced by the "chitosan process" with that of a commercial WPC80.

The following abbreviations and definitions are used throughout the specification and claims:
EDTA=ethylenediaminetetraacetic acid.
GRAS=generally regarded as safe.
MFGM=milk fat globule membrane.
SDS-PAGE=sodium dodecylsulfate-polyacrylamide gel electrophoresis.
WPC=whey protein concentrate.
WPC80=whey protein concentration, 80 wt % protein (dry mass).
WPI=whey protein isolate.
Zinc salt=any salt of zinc that is soluble in cheese whey and non-toxic to humans.

According to the American Dairy Products Institute, the U.S. dairy industry produced approximately 130 million pounds of WPC50-89 and 30 million pounds of WPI in 2006. In contrast, the U.S. dairy industry produced enough cheese whey in 2006 (80 billion pounds) to produce nearly 400 million pounds of WPI (or 500 million pounds of WPC80). The market size for whey protein products has been growing at an annual rate of 25% over the past three years and it is expected to grow exponentially in coming years due to increasing demand for functional protein beverages and increasing demand for dairy protein products from China, Japan, and Southeast Asia. Due to burgeoning world population, there will be an acute shortage of proteins for human nutrition in the near future. Technologies that can separate functional and utilizable proteins from cheese whey and other protein-rich by-products of food processing will be needed to increase protein availability on a national and global scale. In this regard, improvements in storage stability and functional properties of WPC80 will expand the range of food products where WPC80 can be used. This will act an economic incentive for the U.S. dairy industry to convert a far greater proportion of cheese whey produced in the U.S. to WPC80 or WPI.

One of the major problems facing cheese manufacturers and dairy ingredients users across the United States is the quality attributes, such as discoloration and off-flavor development during storage, poor solubility, turbidity, poor foaming and emulsifying properties, etc., of WPC80. Whey processors are desperately looking for an industrial process to reduce the lipid content of WPC80. As discussed earlier, most of the quality defects in WPC80 arise from the presence of MFGM lipids. Thus a process to remove MFGM from cheese whey will result in a quantum leap in the use of WPC80 in foods and beverage products. Furthermore, removing MFGM from cheese whey prior to ultrafiltration and diafiltration operations will make these unit operations more energy efficient and reduce the number of cleaning cycles. These benefits improve economic returns for the dairy industry as a whole and cheese and whey processing industry in particular.

The present process to separate MFGM from cheese whey also provides an alternative source of food-grade lecithin. Because of its demonstrated bioactive and functional food characteristics, MFGM-based lecithin has an advantage over soy lecithin and/or synthetic emulsifiers. The phospholipids content of cheese whey is about 0.02% (w/w). Thus, based on the 2006 U.S. annual production of 80 billion pounds of cheese whey there is the potential to produce 16 million pounds of food-grade lecithin. Pharmaceutical-grade bioactive phospholipids, sphingomyelins and protein fractions from MFGM have a much higher economic potential than food grade lecithin.

The lipids in cheese whey are mostly due to the presence of MFGM fragments and to a lesser extent to the presence of tiny milk fat globules. The MFGM fragments and milk fat globules are present in the form of stable colloidal particles. Under normal pH and ionic strength conditions of cheese whey, these colloidal particles remain in a stable dispersed state due to electrostatic repulsion arising from the negatively charged phosphate groups of the membrane phospholipids. Thus, treatments that neutralize electrostatic repulsion between MFGM fragments should promote flocculation and precipitation as a result of hydrophobic interactions between membrane-bound proteins.

In theory, an increase of ionic strength should effectively neutralize electrostatic charges on the membrane surface and cause precipitation of MFGM fragments. However, this does not occur when monovalent salts, such as NaCl, are used. Monovalent cations form a diffused electrical double layer around the MFGM surface and if the thickness of this electrical double layer is large it may not facilitate flocculation of the MFGM fragments via hydrophobic interaction between membrane-bound proteins. The thickness of the electrical double layer around the MFGM surface depends on the strength of the electrostatic interaction between the mobile cation and the fixed negative charges on the MFGM surface. In contrast, poly-cationic polymers, such as chitosan (polyglucosamine polymer), which contain fixed positive charges along their chain, can engage in strong multiple interactions within and between MFGM fragments and thus facilitate flocculation and precipitation of MFGM fragments. This was the basis of the "chitosan process" discussed earlier (Hwang and Damodaran, 1995).

While not being limited to any underlying biological or chemical phenomenon, theoretically, divalent metal cations, such as $Ca^{+2}$, $Mg^{+2}$, $Mn^{+2}$, $Zn^{+2}$, etc., should be able to neutralize negative charges on the MFGM surface more effectively than monovalent cations. They should also be able to cross-link the MFGM fragments and thereby create conditions for flocculation/precipitation of MFGM fragments via hydrophobic interactions between the MFGM particles. However, the effectiveness of cross-linking by divalent cations may depend on both the ionic radius and the coordination geometry of the cation. For instance, $Mg^{+2}$ has an ionic radius of 0.65 Å and has a strong tendency to form hexa-coordinated complexes in a regular octahedral geometry (Bock et al., 1995; 1999). In contrast, $Ca^{+2}$ has a much larger ionic radius of 0.99 Å and forms either hexa-coordinated complexes with octahedral geometry or octa-coordinated (n=8) complexes with a square anti-prism geometry (Gulsker et al., 1999). By way of comparison, the divalent $Zn^{+2}$ cation, whose ionic radius (0.71 Å) is intermediate between that of $Mg^{+2}$ and $Ca^{+2}$, exhibits a coordination number of 4 to 6 with no preference in terms of energy penalty (Glusker et al., 1999; Bock et al., 1995). In about 50% of the known biological molecules $Zn^{+2}$ exists as a tetra-coordinated complex in a tetrahedral geometry (Bock et al., 1995).

These differences in both the coordination number and the geometry requirements influence the mode of interaction of divalent cations with MFGM. Additionally, where electrostatic cross-linking of two or more planar membrane fragments are involved, the type of coordination geometry of the cation may either facilitate or impede cooperation in ionic cross-linking of the fragments, i.e., formation of one ionic cross-link may increase the strength and probability of formation of subsequent cross-links.

Based on this rationale, the present invention is directed to using salts of various divalent cations ($Mg^{+2}$, $Ca^{+2}$, $Mn^{+2}$, and $Zn^{+2}$) to selectively precipitate MFGM fragments from cheddar cheese whey under various pH and salt concentrations. Among the cations studied, the $Zn^{+2}$ cation is the much preferred cation to induce selective precipitation of MFGM under mild conditions. The preferred protocol is as follows:

Clarified and pasteurized cheese whey is obtained from any suitable source. The whey used in the Examples presented below was obtained from the dairy plant in the Department of Food Science at the University of Wisconsin-Madison, Wis. Cheddar cheese whey was used. This is for convenience and brevity, only. Any cheese whey from any type of cheese or cheese-making process may be used. The pH of pasteurized cheddar cheese whey is typically about 6.4. To an aliquot of cheese whey at 25° C., increasing amounts of zinc salt ($ZnCl_2$, zinc acetate, zinc gluconate, etc.) are added so that the final concentration of $Zn^{+2}$ is in the range of from zero to about 0.05 molal (m). The pH of the whey solution is adjusted toward a lower pH (greater acidity) by adding any suitable acid, typically 1M HCl and incubated for 30 min in a water bath maintained at about 5 to 40° C. It is preferred that the acidity of the whey be adjusted to be less than 6, preferably to between about 3.5 and about 5, more preferably between about 4.0 and about 5.0, more preferably still between about 4.2 and about 4.8. During the incubation time, $Zn^{+2}$ ions interact with the phosphate groups of membrane phospholipids and form coordination complexes with oxygen atoms of the phosphate groups. Because $Zn^{+2}$ ions form tetra-coordinated complexes in a tetrahedral geometry (Bock et al., 1995), it is thought, for steric reasons, the $Zn^{+2}$-MFGM complex involves interaction with two membrane fragments, as shown in FIG. 3.

Figure 3:
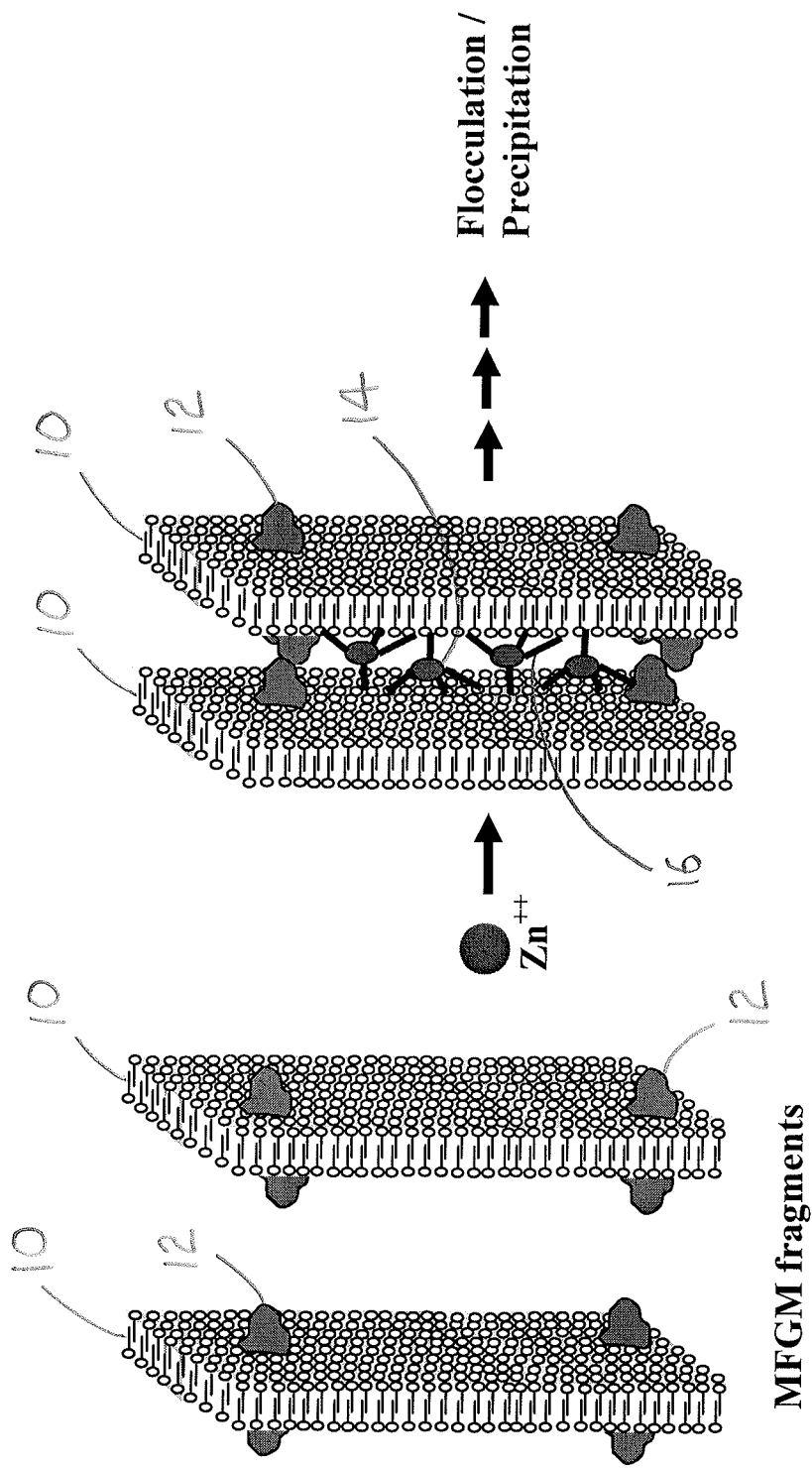
FIG. 3 is a schematic diagram illustrating $Zn^{+2}$-induced precipitation of MFGM in cheese whey.

FIG. 3 is a schematic diagram illustrating $Zn^{+2}$-induced precipitation of MFGM in cheese whey. The MFGM 10 includes membrane proteins 12 embedded within it. Tetra-coordinated zinc molecules 14 form bonds 16. In each four-bond complex, three of the bonds 16 are attached to one MFGM 10, and the fourth bond 16 is attached to another MFGM, thereby linking the two planar MFGM's together. This causes selective flocculation and precipitation of the MFGM as more and more MFGM's are bound to the complex.

Again, not being limited to any given mechanism, it is thought that once the $Zn^{+2}$-MFGM complex is formed, the close proximity of the membranes facilitate hydrophobic interactions between integral membrane proteins 12, as shown in the right-hand side of FIG. 3. This interaction between the membrane-bound proteins 12 further stabilizes the $Zn^{+2}$-MFGM complex. A continuing sequence of such interactions leads to precipitation of the $Zn^{+2}$-MFGM complex, as schematically shown in FIG. 3.

The precipitate is then removed by any means now known or developed in the future for separating a solid precipitate from a filtrate or supernatant, for example, filtration, centrifugation, and the like. Typically, the precipitate is separated from the supernatant via centrifugation at 1116×g for 5 min using a centrifuge. The turbidity of the supernatant can be measured at 500 nm using a spectrophotometer. For performing control comparisons between treated and untreated samples, a control containing no added zinc salt may be treated under identical conditions. The difference in turbidity values of the supernatant between the $Zn^{+2}$-treated whey samples and the controls thus indicates the extent of removal of MFGM from the whey.

Figure 4:
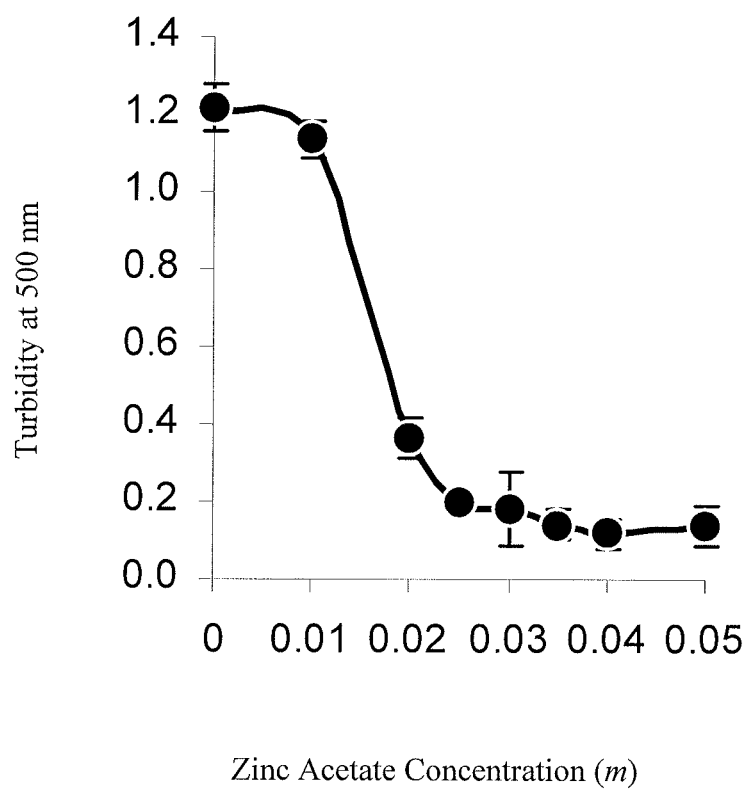
FIG. 4 is a graph depicting the effect of zinc acetate concentration on precipitation and removal of MFGM in cheddar cheese whey at 30° C. and pH 4.5. The bars denote standard deviation (n=3).
Figure 8:
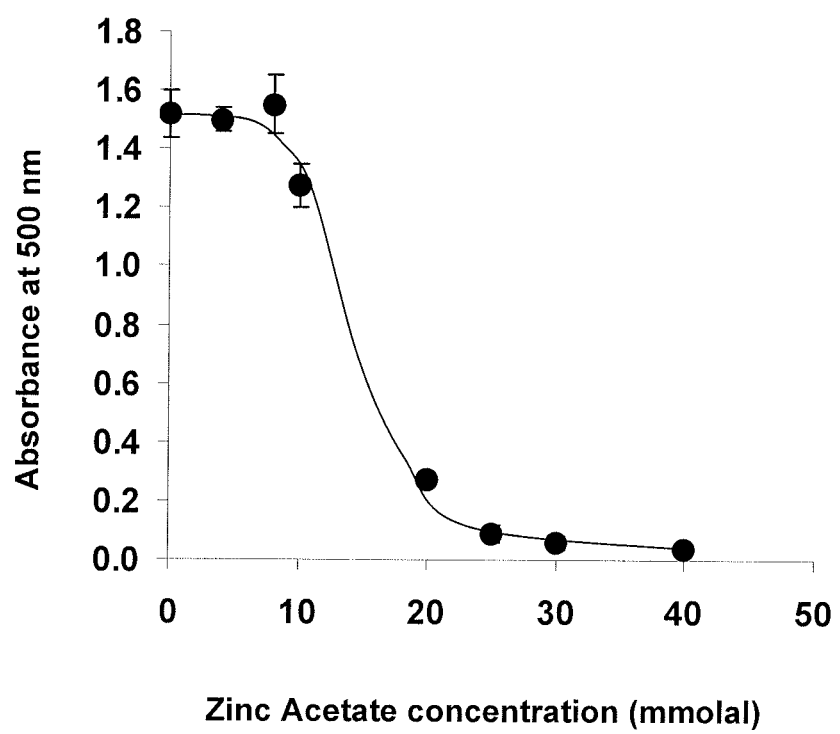
FIG. 8 is another graph depicting the effect of zinc acetate concentration on precipitation and removal of MFGM in cheddar cheese whey at 30° C. and pH 4.5. The bars denote standard deviation (n=3).

FIGS. 4 and 8 show results of adding zinc acetate to whey on the precipitation of MFGM from the whey. In this example, clarified and pasteurized cheese whey was used. The pH of the whey was adjusted to pH 4.5 by adding 1 M HCl. The example was conducted at 30° C. The turbidity of the supernatants of zinc acetate-treated samples decreased with increase of zinc acetate concentration (from 0 [control] to 0.05 molal zinc acetate).

Figure 5:
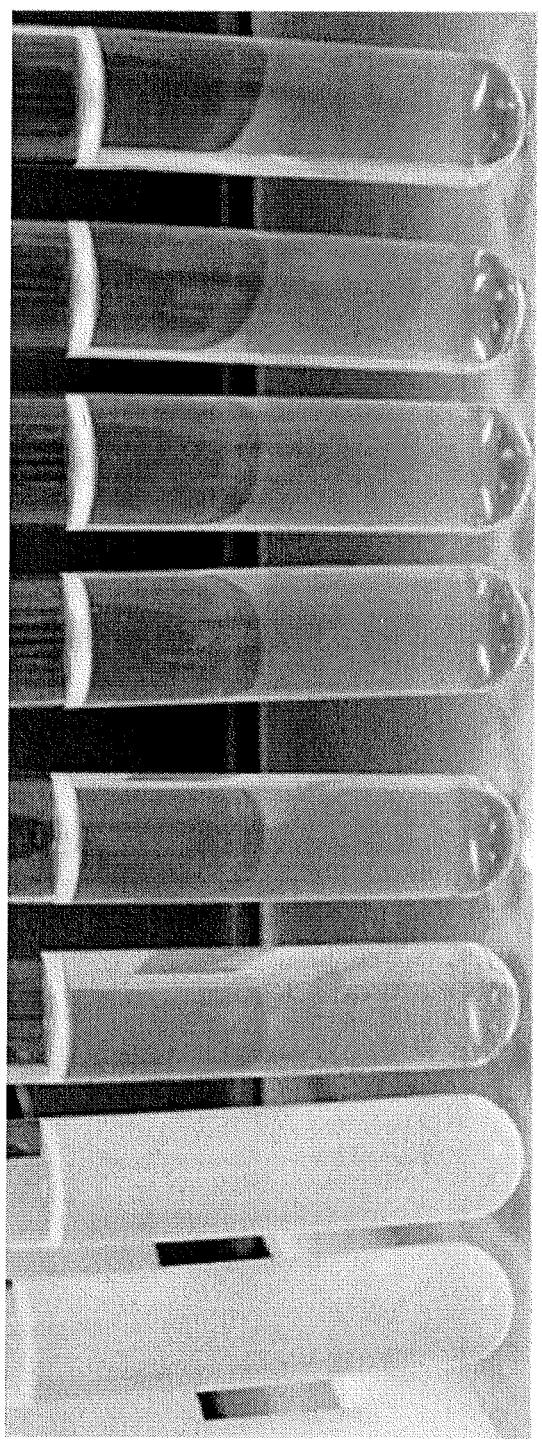
FIG. 5 is a photograph of a series of experiments showing the clarity of supernatants of whey treated with zinc acetate.

FIG. 5 shows the visual clarity of the supernatants whose turbidity values are recorded in FIG. 4. The minimum concentration of zinc acetate required to cause maximum precipitation of MFGM was about 0.025 to about 0.03 m.

Other whey-soluble zinc salts (without limitation) will also function in the invention. These zinc salts include (by way of illustration and not limitation) salts derived from mineral acids and organic acids, explicitly including halides, e.g., chlorides and bromides, sulphates, bisulfates, phosphates, tosylates, nitrates, sulphamates, acetates, citrates, lactates, tartrates, gluconates, malonates, oxalates, salicylates, propionates, succinates, fumarates, maleates, valerates, oleates, palmitates, stearates, laurates, borates, benzoates, naphthylate, mesylate, glucoheptonate, lactiobionate, methylene-bisb-hydroxynaphthoates, gentisates, isethionates, di-p-toluoyltartrates, methane sulphonates, ethanesulphonates, benzenesulphonates, p-toluenesulphonates, cyclohexylsulphamates, quinates, and the like. Other suitable salts are found in, for example, The Handbook of Pharmaceutical Salts, P. H. Stahl and C. G. Wermuch, Eds., © 2002, Verlag Helvitica Chemica Acta (Zurich, Switzerland) and S. M. Berge, et al., "Pharmaceutical Salts," *J. Pharm. Sci.*, 66: p. 1-19 (January 1977), both of which are incorporated herein by reference.

From an environmental standpoint, use of zinc salts of organic acids is more preferable than mineral acids because the organic acids are readily biodegradable. The overall functionality of the method, however, is not significantly impacted by the anion chosen.

Figure 10:
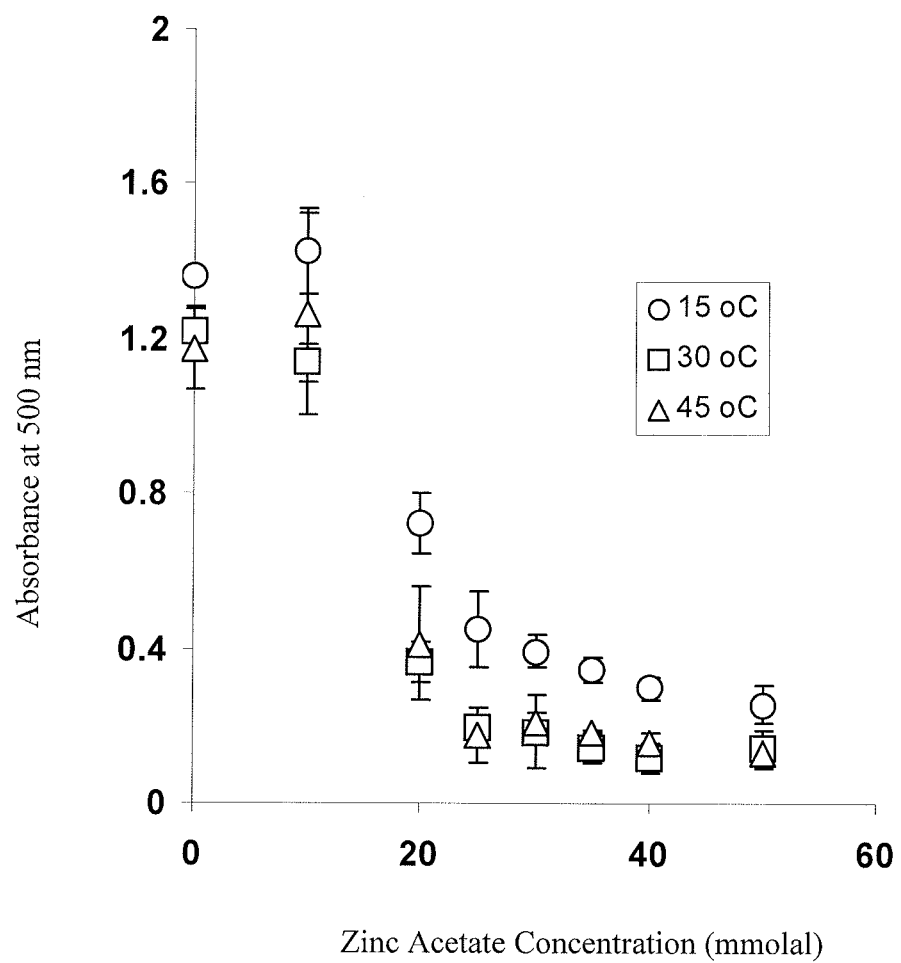
FIG. 10 is a graph depicting the effect of temperature on precipitation of MFGM from single strength cheddar cheese whey at three temperatures.

The method is preferably conducted at room temperature or higher, generally up to about 50° C. Temperatures above 50° C. are within the scope of the invention, but not preferred. Because precipitation of MFGM occurs due to secondary hydrophobic interactions between integral membrane proteins, the efficiency of precipitation is higher at higher temperatures, as shown in FIG. 10. Here, duplicate runs of the inventive method as disclosed herein were performed at three different temperatures: 15° C., 30° C., and 45° C. Precipitation is improved at the higher temperatures (although the invention functioned quite well at all temperatures). However, higher temperatures can also cause undesirable protein denaturation. The preferred temperature range for carrying out the claimed method is from about 15° C. to about 50° C., with about 30° C. to about 40° C. the most preferred temperature range.

One distinct advantage of the present invention is that it selectively precipitates the MFGM from the whey, while leaving the vast majority of proteins in the supernatant. To determine whether loss of whey proteins has occurred during precipitation of MFGM with zinc acetate, the protein content and profile of control and treated whey samples is determined by HPLC using a gel permeation column. The control whey is initially filtered through a 0.2 μm syringe filter to remove MFGM fragments. An aliquot of the filtrate is then injected into the HPLC column and eluted with 20 mM phosphate buffer, pH 7.0, at a flow rate of 0.5 mL/min. The elution profile is recorded by measuring absorbance at 254 nm. The elution profiles are then compared to the elution profiles of the supernatants of zinc acetate-treated whey samples. The loss of protein, if any, in the zinc acetate-treated whey samples is determined by differences in the elution profiles and in the area under each protein peak of the profile. The protein content of the supernatants can also be estimated by measuring the total nitrogen content of untreated whey and comparing it to the total nitrogen content of the supernatant of zinc sat-treated whey using the micro-Kjeldahl method.

Figure 6:
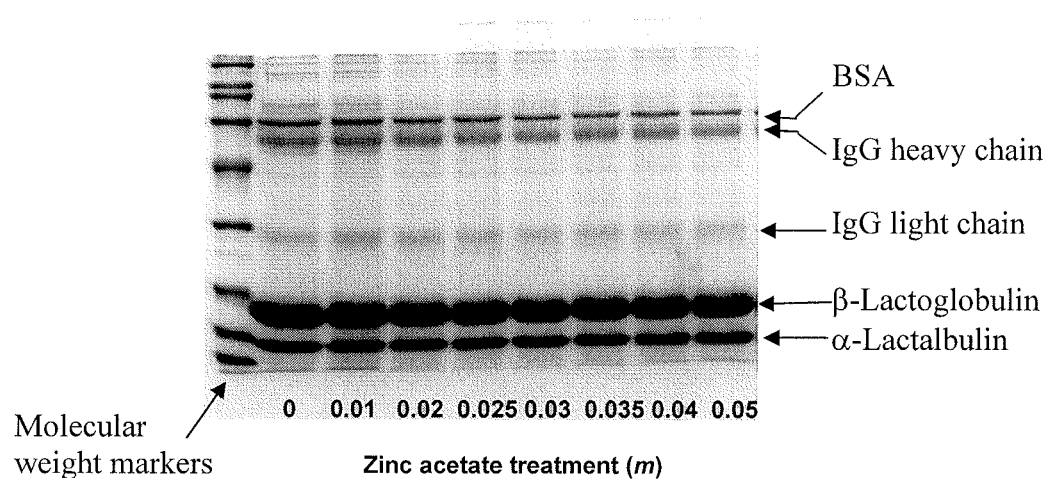
FIG. 6 is an SDS-PAGE gel showing the profiles of control whey and supernatants of zinc acetate-treated whey samples.

To determine if the zinc salt treatment has caused loss of any specific minor protein(s) of whey, the protein profiles of the control and treated whey are analyzed by performing sodium dodecylsulfate-polyacrylamide gel electrophoresis (SDS-PAGE). SDS-PAGE is performed using a 12% linear gradient slab gel as described by Laemmli (1970). The supernatants of the zinc acetate-treated whey samples from FIG. 5 were subjected to SDS-PAGE and the results are shown in FIG. 6. As can be seen from the gel depicted in FIG. 6, the protein profiles of the supernatants of the treated whey samples were very nearly identical to that of the control whey. Likewise, the intensities of the protein bands, especially β-lactoglobulin, α-lactalbumin, BSA, and IgG light and heavy chains were virtually identical, indicating that no soluble whey proteins were lost during selective precipitation of MFGM by the zinc salt. Similar results are obtained when the method is practiced using other zinc salts.

The above example indicates that only about 0.025 to about 0.03 m zinc salt is needed to cause selective precipitation of MFGM from single strength whey. Thus, additional studies were conducted to determine if the amount of zinc salt needed to precipitate a given mass of MFGM could be reduced by using pre-concentrated cheese whey, e.g., two- or five-fold concentrated whey. The hypothesis at the outset was that the concentration ratio of $Zn^{+2}$ to MFGM needed to cause effective precipitation of MFGM might follow a non-linear relationship with the MFGM content of the whey. Hence the amount of $Zn^{+2}$ needed to precipitate a given mass of MFGM in 5-fold concentrated whey might be less than that needed to precipitate the same mass of MFGM from single strength whey. To test this possibility, cheese whey is concentrated to 2- and 5-fold by ultrafiltration using a 10,000 Da molecular weight cut-off membrane. Experiments similar to that shown for FIGS. 4 and 8 are then carried out on single strength, 2-fold, and 5-fold concentrated whey. The minimum concentration of Zn salt needed to cause complete precipitation of MFGM is determined in each case. If the five-fold concentrated whey requires Zn salt concentration less than 5×0.025 m (see FIG. 4), then the above assumption is correct. This information is very useful in commercial scale operations.

Figure 9:
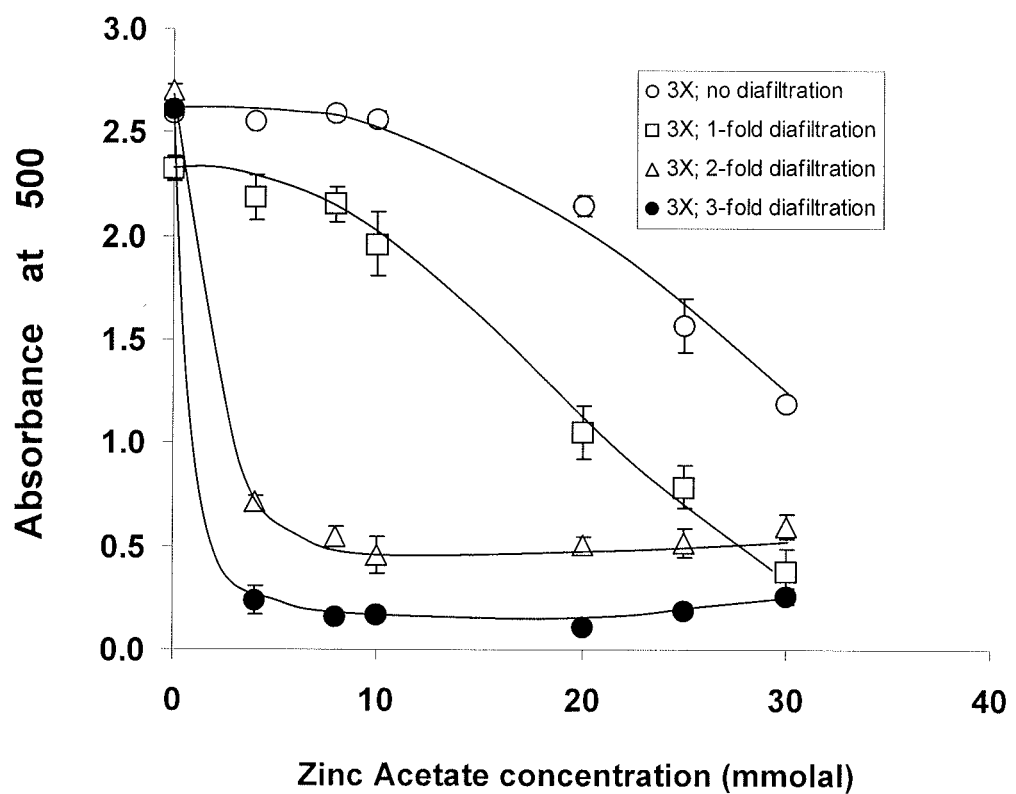
FIG. 9 is a graph depicting the effect of diafiltration on the precipitation of MFGM in 3-fold concentrated cheddar cheese whey using zinc acetate, pH 4.5.

FIG. 9 shows the results of diafiltration (0, 1-fold, 2-fold, and 3-fold diafiltration) with respect to whey to which had been added various concentrations of zinc acetate. In all cases, adding 30 mmolal zinc acetate to whey significantly clarified the whey solution.

To determine fat content, the control whey and the supernatants of the treated whey are dialyzed against water for 24 h with multiple changes of water at pH 4.5 to remove lactose and salts and then lyophilized. The fat content of these dried WPI/WPC80 samples is then determined according to the Mojonnier method (Newlander and Atherton, 1977). A fat content of less than 0.2% on w/w protein basis is conventionally regarded as fat-free.

The results shown here clearly demonstrate that the present invention is sound and useful for selectively removing MFGM from whey, thereby yielding a clarified whey that is rich in proteins and fat-free. The $Zn^{+2}$ cation causes selective precipitation of MFGM at low concentrations.

Figure 7:
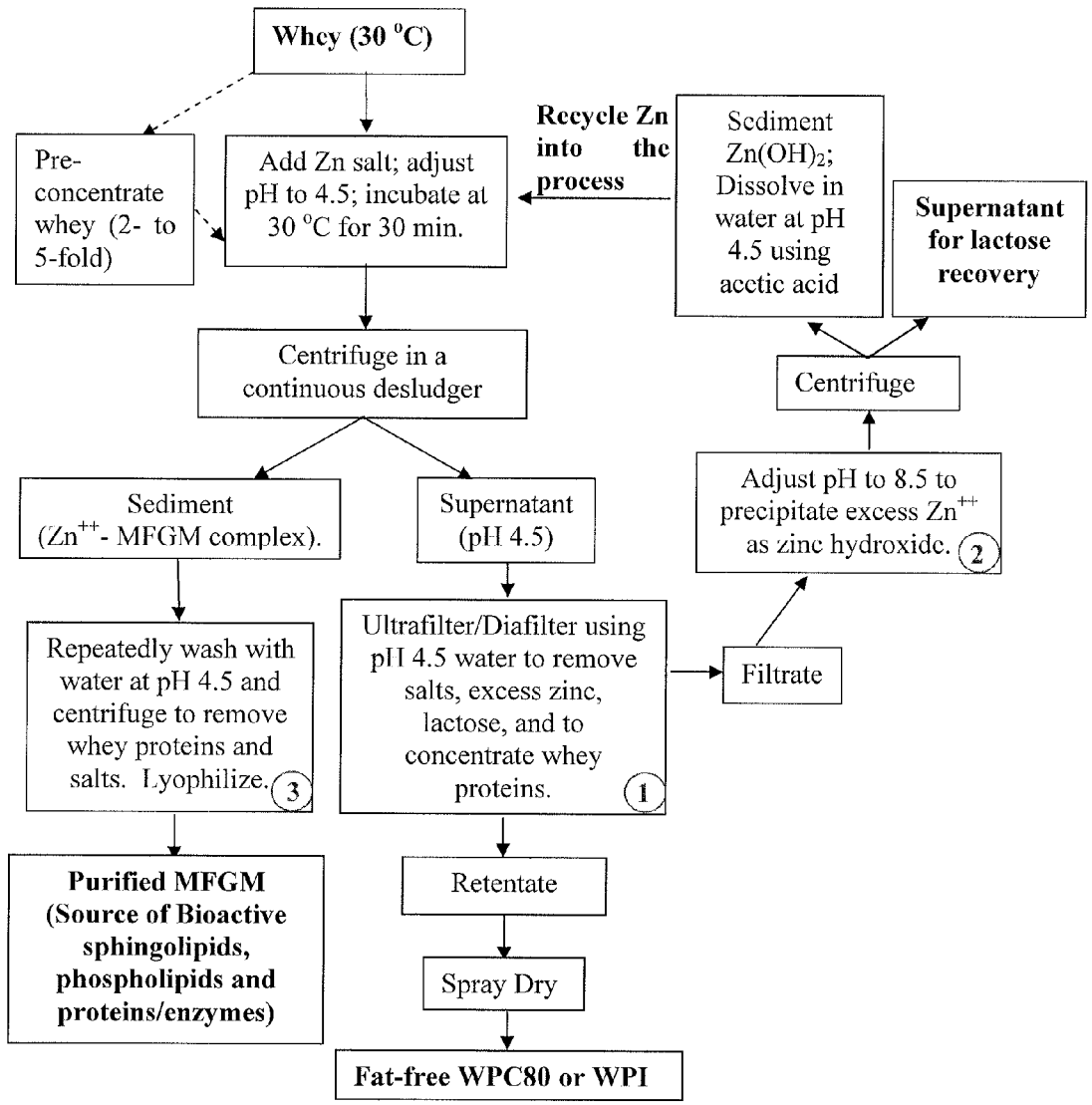
FIG. 7 is a flow chart depicting a preferred version of the invention for using zinc acetate to separate MFGM from whey and to produce a fat-free WPC80 and/or WPI.

A pilot-scale process for implementing the present invention is depicted schematically in FIG. 7:

In the upper left corner of FIG. 7, the whey is first heated to about 30° C., pre-concentrated to 2× to 5× whey. The zinc salt is then added to the whey, the pH is adjusted to about 4.5 by adding acid, and the mixture is allowed to incubate for a period of time to allow the MFGM to precipitate from the whey. The whey and precipitate is then centrifuged to yield a precipitate (or sediment) and the supernatant. The sediment contains zinc complex of the MFGM. As shown in Box 3 of FIG. 7, the sediment is washed with water at pH 4.5 to remove any remaining whey proteins and salts, and then lyophilized. The product from this arm of the process is purified MFGM, as shown in the lower-left corner of FIG. 7.

As shown in Box 1 of FIG. 7, the supernatant can be ultrafiltered and diafiltered to remove the salts, excess zinc, lactose, and to concentrate the whey proteins. The retentate is dried to yield fat free WPC80 or WPI.

The filtrate from ultrafiltration and diafiltration comprises mainly zinc salts and lactose. The zinc can be recycled by adjusting the filtrate to pH 8.5 which cause the zinc to precipitate as zinc hydroxide. See Box 2 of FIG. 7. Centrifugation yields zinc hydroxide as the precipitate. The supernatant contains dissolved lactose, which can be recovered as shown in the far right-hand box of FIG. 7. The zinc hydroxide can be re-dissolved in an aqueous solution of acetic acid, pH 4.5, to yield zinc acetate, which is recycled back into the process.

Delving into greater detail with respect to particular steps in the process, in Box 1 (ultrafiltration/diafiltration), the ultrafiltration/diafiltration system may be configured in several different ways. For example, in multiple element systems, the filters may be arranged in series or parallel. Excess zinc salt that might be present in the supernatant of treated whey remains soluble at pH 4.5; however, when the pH is increased to slightly alkaline pH, the $Zn^{+2}$ is converted to $Zn(OH)_2$ which is insoluble. Therefore, ultrafiltration/diafiltration should be performed at acidic pH less than 6 to ensure complete removal of zinc from the retentate. At later stages of diafiltration, the pH of the water can be gradually increased to 7.0. As shown in FIG. 5, the supernatant of $Zn^{+2}$-treated whey is very clear. Therefore the efficiency of ultrafiltration/diafiltration is very high and fouling of the membrane is concomitantly low. This results in energy savings and substantially reduces the frequency of cleaning cycles compared to conventional processes.

In Box 2 of FIG. 7, the $Zn^{+2}$ cation is readily converted to insoluble zinc hydroxide when the pH of a zinc salt solution is adjusted to pH 8.5 using NaOH. Zinc hydroxide is >99.5% insoluble at pH 8.5. This property of zinc provides an opportunity to recover excess $Zn^{+2}$ from the permeate. When the recovered $Zn(OH)_2$ pellet is dissolved in dilute acetic acid or gluconic acid, it is converted to soluble zinc acetate or zinc gluconate. This can then be then reused in the process and thus improve the economics of the process. The recovery of the zinc used is very nearly quantitative. Almost 100% of the zinc salt used in the process can be recycled. Thus the on-going process costs are very close to neutral.

In Box 3 of FIG. 7 is shown the precipitated Zn-MFGM complex. The $Zn^{+2}$-MFGM pellet is washed repeatedly with pH 4.5 water and re-centrifuged to remove whey/whey proteins from the pellet. The $Zn^{+2}$-MFGM complex remains intact and insoluble during this washing step, indicating that $Zn^{+2}$ does readily dissociate from the complex $Zn^{+2}$-MFGM complex. If removal of $Zn^{+2}$ from the complex is desirable, this can be achieved by treating the washed $Zn^{+2}$-MFGM with a 10 mM EDTA solution. Chelation of $Zn^{+2}$ by EDTA releases the MFGM from the zinc-MFGM complex to form a stable dispersion that will not sediment when centrifuged. If desired, the dispersion may be filtered/diafiltered using a 0.2 micron microfiltration membrane to remove the $Zn^{+2}$-EDTA complex. The retentate can then be freeze-dried and stored under an inert atmosphere (e.g., nitrogen) to prevent auto-oxidation of the membrane lipids. This MFGM preparation contains all of the functional and bioactive lipids and membrane-bound proteins found in crude whey. The MFGM material itself is value-added and can be used as a bioactive supplement in therapeutic foods, geriatric foods, and also in infant formula. Alternatively, the phospholipids from the MFGM can be extracted using polar solvents and used as dairy lecithin.

Zinc is an essential nutrient and most of the zinc salts, including the preferred salts zinc acetate, zinc gluconate, and zinc chloride, have been approved by the U.S. Food & Drug Administration as GRAS substances. Thus, all of the steps in the invention yield a product that is safe for human consumption. All unit operations noted in the process depicted in FIG. 7 are already in place in the WPC80 manufacturing industry and therefore implementing the invention on a commercial scale does not require any additional capital investment. Zinc salts are very cheap and have an insignificant effect on the economics of the process. Because almost all of the zinc used in the process can be recovered as $Zn(OH)_2$ and recycled back into the process, the process is effectively cost-neutral. Any additional cost of production of WPC80 using the present invention can be readily recovered by energy savings from the improved efficiency of the ultrafiltration/diafiltration operations, the reduced frequency of cleaning cycles, and the economic returns arising from bioactive MFGM and its very valuable lipid and protein/enzyme components.

As noted earlier, the lipids in cheese whey are mostly associated with the MFGM fragments and to a lesser extent in the form of tiny milk fat globules. In theory decreasing the charge on the phosphate groups of membrane phospholipids by lowering the pH should result in decreased electrostatic repulsion and therefore enhanced hydrophobic interaction between membrane-bound proteins. However, this does not occur. It is likely that the cations, especially the divalent cations such as $Ca^{+2}$, present in cheese whey might already exist in the form of a hexa-coordinated complex with the octahedral geometry or an octa-coordinated complex with a square antiprism geometry (Gulsker et al., 1999) between membrane phospholipids. The stability of these complexes might be insensitive to pH of the whey. Furthermore, the octahedral and/or square antiprism geometry of the complex between $Ca^{+2}$ and MFGM may prohibit hydrophobic interaction between membrane proteins and thereby prevent its precipitation at all pH values. While not being limited to any particular underlying phenomenon or mechanism, if this is true, dissociating the cation-MFGM coordination complexes by removing all salts from cheese whey via diafiltration should render MFGM very sensitive to precipitation at a pH where the negative charges of membrane phospholipids are neutralized or substantially reduced.

Thus, the following examples were carried out to test the above hypothesis. Clarified and pasteurized cheddar cheese whey was obtained from the dairy plant in the Department of Food Science at the University of Wisconsin-Madison. The pH of the whey was 6.1. Five liters (5 L) of whey was concentrated five-fold (5×) using a Millipore ProFlux M12 Tangential Flow Filtration System equipped with a 10 kDa molecular weight cut-off ultrafiltration membrane. The retentate was then diafiltered with 3 L of distilled water in a continuous mode. Aliquots of the retentate were withdrawn as a function of the extent of diafiltration. The conductivity (0/cm) and total dissolved solids (mg/mL) of these aliquots were determined using a conductivity meter. These results are shown in Table 1.

TABLE 1

Conductivity of cheese whey sample that have been diafiltered to various extent.

| Fold-diafiltration | Conductivity (μS/cm) | Total Dissolved Solids (mg/mL) |
| --- | --- | --- |
| 0 | 5211 | 181.2 |
| 0.25 | 4365 | 147.9 |
| 0.50 | 3461 | 119.9 |
| 0.75 | 2692 | 92.6 |
| 1.00 | 2096 | 72.6 |
| 1.25 | 1623 | 56.1 |
| 1.50 | 1296 | 45.3 |
| 1.75 | 1048 | 36.2 |
| 2.00 | 833 | 28.8 |
| 2.25 | 684 | 23.8 |
| 2.50 | 567 | 19.6 |
| 2.75 | 500 | 17.25 |
| 3.00 | 437 | 15.12 |

Figure 11:
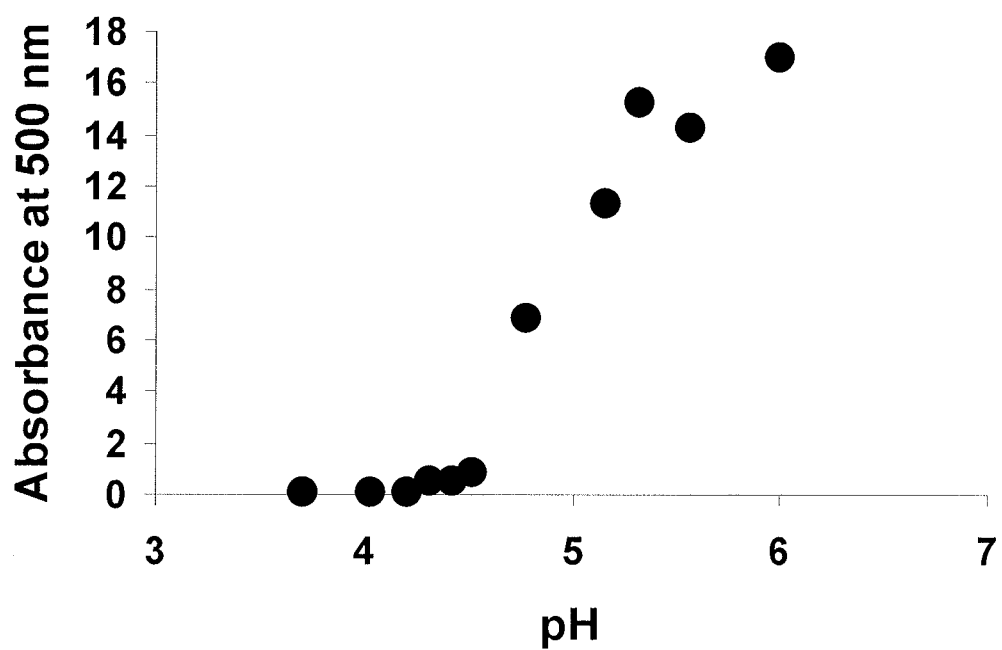
FIG. 11 is a graph depicting the effect of pH on precipitation of MFGM in 3-fold diafiltered 5× whey.

To determine the minimum pH at which maximum precipitation of MFGM occurs in a desalted whey, 3 mL aliquots of the 3-fold diafiltered 5× whey were adjusted to various pH values between 3.5 and 6.0. The samples were then centrifuged at 1300×g (3500 rpm in a SS-34 Sorvall rotor) for 5 min. The supernatant was decanted and its turbidity at 500 nm was measured using a spectrophotometer. A plot of pH versus turbidity of the supernatant is shown in FIG. 11. As can be seen from FIG. 11, absorbance increased proportionally (in a roughly sigmoid trace) with pH.

Figure 12:
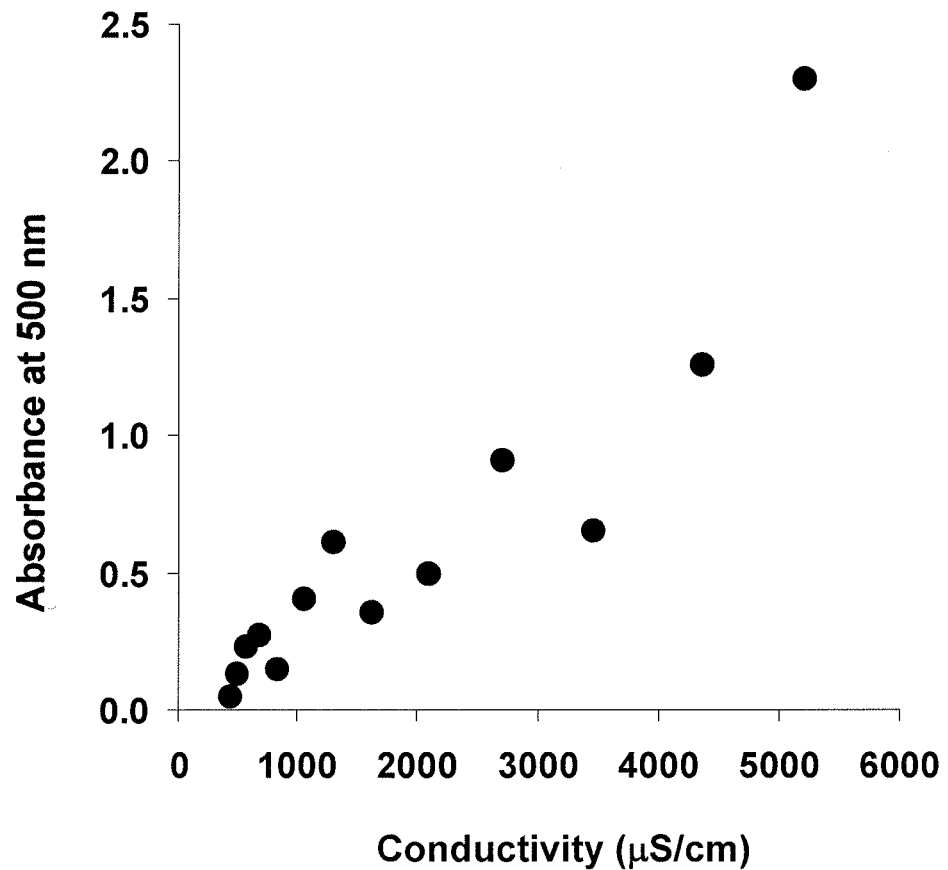
FIG. 12 is a graph depicting the effect of conductivity (fold-diafiltration) on precipitation of MFGM at pH 4.2 in 5× concentrated and 3-fold diafiltered cheese whey.

To determine the effect of the conductivity of whey, which is related to the extent of diafiltration, the pH of 3 mL aliquots of the diafiltered whey samples were adjusted to pH 4.2 and centrifuged at 1300×g for 5 min. The turbidity of the supernatants was measured at 500 nm. The relationship between conductivity and turbidity at 500 nm are shown in FIG. 12. As can be seen from the figure, turbidity had a proportional relationship to conductivity.

Combining the results shown in FIGS. 11 and 12, the results indicate that maximum precipitation of MFGM at pH 4.2 occurs when the 5× whey is diafiltered at least 2 to 3-fold with water.

Figure 13:
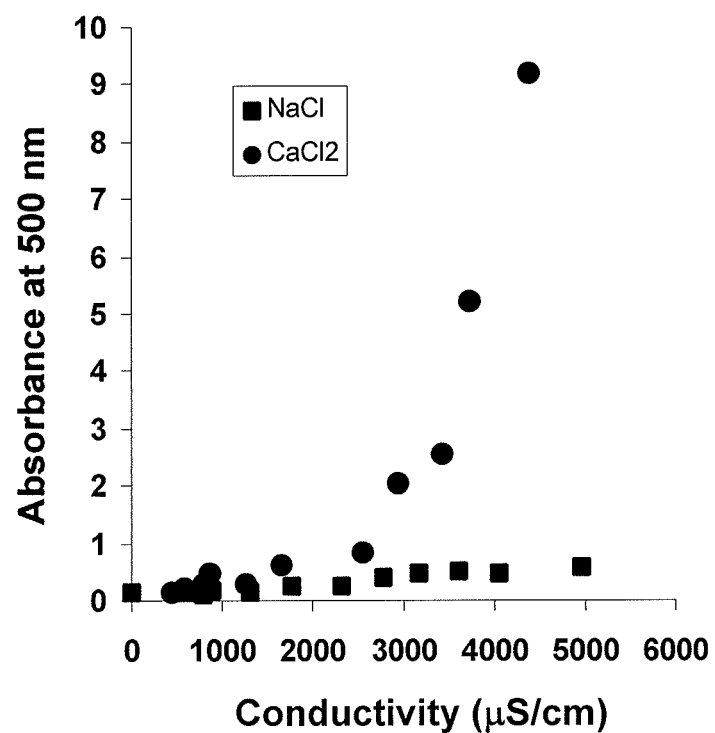
FIG. 13 is a graph depicting the effects of NaCl and $CaCl_2$ and conductivity on precipitation of MFGM in 3-fold diafiltered 5× whey.

To elucidate whether the effect of the solution conductivity on the efficiency of precipitation of MFGM at pH<4.2 was dependent on the type of salt present in the whey, the following experiment was carried out: To 5× concentrated and 3-fold diafiltered whey, which had a conductivity of 442 μS/cm, was added increasing amount of NaCl to increase the conductivity of the whey. The samples were then adjusted to pH 4.2 and centrifuged at 1300×g for 5 min in a Sorvall centrifuge. The turbidity of the supernatants was measured at 500 nm. A similar experiment under identical experimental conditions was also carried out using $CaCl_2$, instead of NaCl, to increase the conductivity of the solution. The results of these two experiments are shown in FIG. 13.

It should be noted that in the conductivity range studied, NaCl and $CaCl_2$ have dramatically different effects on precipitation of MFGM at pH 4.2. Adding $CaCl_2$ to the 3-fold diafiltered whey actually stabilized MFGM against flocculation/precipitation at pH 4.2. See FIG. 13—the turbidity of the supernatant increases proportionally with increased $CaCl_2$ concentration. In contrast, NaCl had only very little effect on MFGM precipitation in the conductivity range studied. These data confirm the hypothesis that the stability of MFGM against precipitation at pH 4.2 in original cheese whey is due to formation of an octa-coordinated complex with octahedral geometry between $Ca^{+2}$ and MFGM fragments. Note that the conductivity of the 5×-concentrated cheese whey was about 5211 μS/cm prior to diafiltration and therefore a majority of the stabilizing effect against precipitation of MFGM at pH 4.2 might be related to significant amount of $Ca^{+2}$ in cheese whey.

Figure 14:
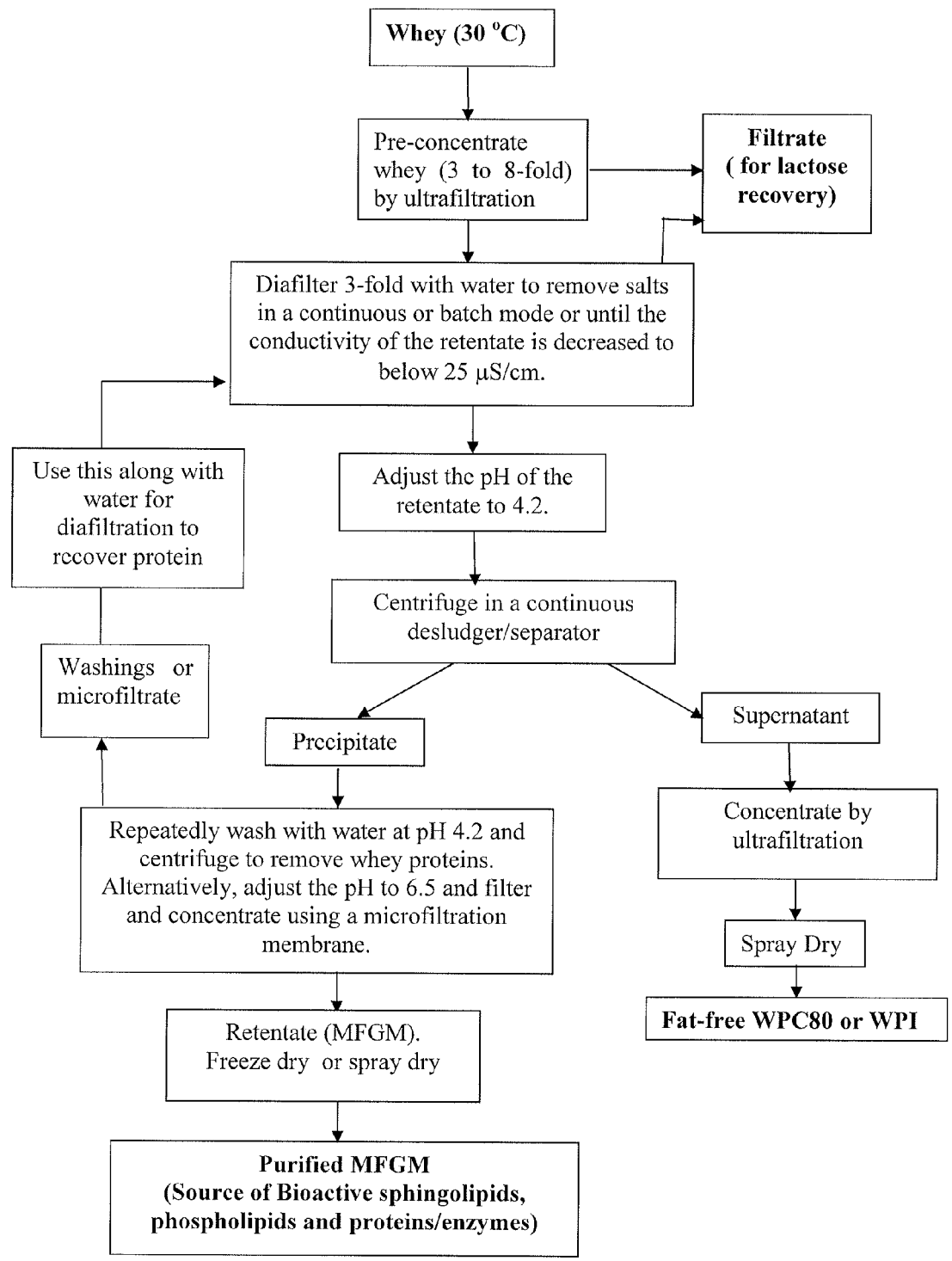
FIG. 14 is a flow chart depicting a preferred version of the invention to separate MFGM from whey and to produce a fat-free WPC80 and/or WPI without the use of zinc salt.

Based on the above results, another version of the invention is outlined in FIG. 14 for separating MFGM with intact bioactive lipids/proteins from the protein fraction of whey. In the version of the invention outlined in FIG. 14, the whey is first concentrated. It is preferred that the whey be concentrated at least 2× and more preferably from between about 3× and 8×.

Lactose and salts are then removed from the whey. This is preferably accomplished via diafiltration. Diafiltration yields a filtrate containing the lactose and a retentate containing the other remaining solubilized constituents of the crude whey. Diafiltration should proceed until the conductivity of the retentate is about 960 μS/cm or less, more preferably about 480 μS/cm or less.

The pH of the rententate is then adjusted downward by adding acid. It is preferred that the pH of the retentate be adjusted to be between about 3.5 and about 5, more preferably between about 4.0 and about 5.0, and more preferably still between about 4.0 and about 4.2. As shown in FIG. 14, adjusting the pH of the rententate to about 4.2 is most preferred. This causes the MFGM and fat globules within the retentate to precipitate. They can then be separated from the supernatant by any means, including microfiltration Centrifugation is most efficient.

The supernatant contains the protein portion of the whey and the precipitate contains the MFGM fraction and the membrane-bound proteins found within the MFGM. As shown in FIG. 14, the supernatant is concentrated and dried to yield fat-free WPC80 or WPI.

The precipitate containing the MFGM fragments may be further processed as shown in FIG. 14. Thus, the MFGM fraction may be washed with water at acidic pH (about pH 4.2) and centrifuged to remove membrane-bound proteins. Alternatively, after washing, the pH can be adjusted to about 6.5 and the precipitate filtered. The MFGM fragments are found in the retentate after filtering.

BIBLIOGRAPHY

Auge, N., andrieu, N., Negresalvayre, A., Thiers, J. C., Levade, T., and Salvayre, R. 1996. The sphingomyelin-ceramide signaling pathway is involved in oxidized low-density lipoprotein-induced cell proliferation. J. Biol. Chem. 271:19251-19255.

Bock, C. W., Katz, A. K., and Glusker, J. P. 1995. Hydration of zinc ions: A comparison with magnesium and beryllium ions. J. Am. Chem. Soc. 117:3754-3765.

Bock, C. W., Katz, A. K., Markham, G. D., and Glusker, J. P. 1999. J. Am. Chem. Soc. 121:7360-7372.

Breslau, B. R., Goulet, J. and Cross, R. A. 1975. Production of a crystal clear, bland tasting protein solution from cheese whey. Cultured Dairy Prod. J. 10:13-14.

Carunchia Whetstine, M. E., Drake, M. A. and Croissant, A. 2004. Characterization of dried whey protein concentrate and isolate flavor. J. Dairy Sci. 88:3826-3839.

Chen, C. S., Rosenwald, A. G., and Pagano, R. E. 1995. Ceramide as a modulator of endocytosis. J. Biol. Chem. 270:13291-13297.

Chmura, S. J., Nodzenski, E., Weichselbaum, R. R., and Quintans, J. 1996. Protein kinase C inhibition induces apoptosis and ceramide production through activation of a neutral sphingomyelinase. Cancer Res. 56:2711-2714.

Dyatlovitskaya, E. V. 1995. Sphingolipids and malignant growth. Biochemistry (Moscow) 60:629-633.

Fong, B. Y., Norris, C. S., and MacGibbon, A. K. H. 2007. Protein and lipid composition of bovine milk-fat-globule membrane. Int. Dairy J. 17:275-288.

Holt, C., McPhail, D., Nylander, T., Otte, J., Ipsen, R. H., Bauer, R., Ogendal, L., Olieman, K., de Kruif, K. G., Leonil, J., Molle, D., Henry, G., Maubois, J. L., Perez, M. D., Puyol, P., Calvo, M., Bury, S. M., Kontopidis, G., McNae, I., Sawyer, L., Ragona, L., Zetta, L., Molinari, H., Klarenbeek, B., Jonkman, M. J., Moulin, J., and Chatterton D. 1999. Some physico-chemical properties of nine commercial or semi-commercial whey protein concentrates, isolates and fractions. Int. J. Food Sc. Technol. 34:587-601.

Hwang, D. and Damodaran, S. (1995) Selective precipitation of fat globule membrane from cheese whey using chitosan. J. Agric Food Chem. 43, 33-37.

Grindstaff, D. A. and Ahern, W. P. 1975. Process for pretreating raw cheese whey. U.S. Pat. No. 3,864,506.

Gulsker, J. P., Katz, A. K., and Bock, C. W. 1999. Metal ions in biological systems. The Rigaku J. 16:8-16.

Jayadev, S., Liu, B., Bielawska, A. E., Lee, J. Y., Nazaire, F., Pushkareva, M. Y., Obeid, L. M., and Hannun, Y. A. 1995. J. Biol. Chem. 270:2047-2052.

Kanno, C. 1990. Secretory membranes of the lactating mammary gland. Protoplasma 159:184-208.

Lehmann, H. and Wasen, I. 1990. Method of dephospholipidating whey. U.S. Pat. No. 4,897,279.

Laemmli, U. K. 1970. Cleavage of structural proteins during the assembly of the head of bacteriophage $T_4$. Nature 227: 680-685.

Mana, P., Goodyear, M., Bernard, C., Tomioka, R., Freire-Garabal, M., and Linares, D. 2004. Tolerance induction by molecular mimicry: Prevention and suppression of experimental autoimmune encephalomyelitis with the milk protein butyrophilin. Int. Immunol. 16:489-499.

Mather, I. H. 2000. A review and proposed nomenclature for major proteins of the milk-fat globule membrane. J. Dairy Sci. 83:203-247.

Maubois, J. L., Pierre, A., Fauquant, J., and Piot, M. 1987. Industrial fractionation of main whey proteins. Int. Dairy Fed. Bull. 212:154-159.

McDaniel, M. A., Maier, S. F., and Einstein, G. O. 2003. "Brain-specific" nutrients: A memory cure? Nutrition 19:955-956.

Morr, C. V. and Ha, E. Y. W. 1991. Off-flavors of whey protein concentrates: a literature review. Int. Dairy J. 1:1-11.

Newlander, J. A., and Atherton, H. V. 1977. Babcock, Gerber, Mohonnier tests for fat. In *The Chemistry and Testing of Dairy Products*; AVI Publishing: Westport, Conn., 1977; p. 103.

Obeid, L. M. and Hannun, Y. A. 1995. Ceramide—a stress signal and mediator of growth suppression and apoptosis. J. Cell. Biochem. 58:191-198.

Oshida, K., Shimizy, T., Takase, M., Tamura, Y., Shimizu, T., and Yamashiro, Y. 2003. Effect of dietary sphingomyelin on central nervous system myelination in developing rats. Pediatr. Res. 53:580-592.

Rinn, J-C., Mon, C. V., Seo, A., and Surak, J. G. 1990. Evaluation of nine semi-pilot scale whey pretreatment modifications for producing whey protein concentrate. J. Food Sci., 55, 510-515.

Sasaki, T., Hazeki, K., Hazeki, O., and Ul-M Katada, T. 1995. Permissive effect of ceramide on growth factor-induced cell-proliferation. Biochem. J. 311:829-834.

Spitsberg, V. L., Matitashvili, E., and Gorewit, R. C. 1995. Association of fatty acid binding protein and glycoprotein CD36 in the bovine mammary gland. Eur. J. Biochem. 230:872-878.

Spitsberg, V. L. and Gorewit, R. C. 1997. Anti-cancer proteins found in milk. CALS News, Vol. 3(5). Cornell University, Ithaca, N.Y.

Spitsberg, V. L. 2005. Invited review: Bovine milk fat globule membrane as a potential nutraceutical. J. Dairy Sci. 88: 2289-2294.

Vaghela, M. and Kilara, A. 1996. Lipid composition of whey protein concentrates manufactured commercially and in the laboratory. J. Dairy Sci. 79:1171-1183.

Venable, M. E., Lee, J. L., Smyth, M. J., Bielawska, A., and Obeid, L. M. 1995. Role of ceramide in cellular senescence. J. Biol. Chem. 270:30701-39708.

Vesper, H., Schmelz, E.-M., Nikolova-Karakashian, M. N., Dillehay, D. L., Lynch, D. V., Merrill, A. H. Jr., 1999. Sphingolipids in food and the emerging importance of sphingolipids to nutrition. J. Nutr. 129:1239-1250.

Wang, X., Hirmo, S., Millen, R., and Wadstrom, T. 2001. Inhibition of *Helicobacter pylori* infection by bovine milk glycoconjugates in a BALB/cA mouse model. FEMS Immunol. Med. Microbiol. 20:275-281.

Wright, S. C., Zheng, H., and Zhong, J. 1996. Tumor-cell resistance to apoptosis due to a defect in the activation of sphingomyelinase and the 24 kDa apoptotic protease (Ap24). FASEB Journal 10:325-332.

What is claimed is:

1. A method of selectively separating milk fat globule membrane fragments and milk fat globules from whey comprising:
   (a) adding to whey an amount of a whey-soluble zinc salt; and
   (b) adjusting pH of the whey to be less than 6.0;
   (c) wherein the amount of zinc salt added to the whey is sufficient to cause milk fat globule membrane fragments and milk fat globules contained in the whey to precipitate selectively from the whey.

2. The method of claim 1, wherein step (a) comprises adding to the whey a whey-soluble zinc salt selected from the group consisting of zinc halides, zinc sulphates, zinc bisulfates, zinc phosphates, zinc tosylates, zinc nitrates, zinc sulphamates, zinc acetates, zinc citrates, zinc lactates, zinc tartrates, zinc gluconates, zinc malonates, zinc oxalates, zinc salicylates, zinc propionates, zinc succinates, zinc fumarates, zinc maleates, zinc valerates, zinc oleates, zinc palmitates, zinc stearates, zinc laurates, zinc borates, zinc benzoates, zinc naphthylate, zinc mesylate, zinc glucoheptonate, zinc lactiobionate, zinc methylene-bis-b-hydroxynaphthoates, zinc gentisates, zinc isethionates, zinc di-p-toluoyltartrates, zinc alkylsulphonates, zinc benzenesulphonates, zinc p-toluenesulphonates, zinc cyclohexylsulphamates, and zinc quinates.

3. The method of claim 1, wherein step (a) comprises adding to the whey a whey-soluble zinc salt selected from the group consisting of zinc chloride, zinc acetate, and zinc gluconate.

4. The method of claim 1, wherein step (b) comprises adjusting the pH of the whey to be between about 3.5 and about 5.

5. The method of claim 1, wherein step (b) comprises adjusting the pH of the whey to be between about 4.0 and about 5.0.

6. The method of claim 1, wherein step (b) comprises adjusting the pH of the whey to be between about 4.2 and about 4.8.

7. The method of claim 1, wherein in step (a) the amount of a whey-soluble zinc salt added to the whey is sufficient to yield a concentration of $Zn^{+2}$ in the whey of from about 0.01 molal to about 0.05 molal.

8. The method of claim 1, comprising performing steps (a) and (b) at a temperature of from about 15° C. to about 50° C.

9. The method of claim 1, comprising performing steps (a) and (b) at a temperature of from about 30° C. to about 40° C.

10. A method of selectively separating milk fat globule membrane fragments and milk fat globules from whey comprising:
(a) adding to whey an amount of a whey-soluble zinc salt; and
(b) adjusting pH of the whey to be from about 4.2 to about 4.8;
(c) wherein the amount of zinc salt added to the whey is sufficient to cause milk fat globule membrane fragments and milk fat globules contained in the whey to precipitate selectively from the whey.

11. The method of claim 10, wherein in step (a) the amount of a whey-soluble zinc salt added to the whey is sufficient to yield a concentration of $Zn^{+2}$ in the whey of from about 0.01 molal to about 0.05 molal.

12. The method of claim 10, wherein step (a) comprises adding to the whey a whey-soluble zinc salt selected from the group consisting of zinc halides, zinc sulphates, zinc bisulfates, zinc phosphates, zinc tosylates, zinc nitrates, zinc sulphamates, zinc acetates, zinc citrates, zinc lactates, zinc tartrates, zinc gluconates, zinc malonates, zinc oxalates, zinc salicylates, zinc propionates, zinc succinates, zinc fumarates, zinc maleates, zinc valerates, zinc oleates, zinc palmitates, zinc stearates, zinc laurates, zinc borates, zinc benzoates, zinc naphthylate, zinc mesylate, zinc glucoheptonate, zinc lactiobionate, zinc methylene-bis-b-hydroxynaphthoates, zinc gentisates, zinc isethionates, zinc di-p-toluoyltartrates, zinc alkylsulphonates, zinc benzenesulphonates, zinc p-toluenesulphonates, zinc cyclohexylsulphamates, and zinc quinates.

13. The method of claim 10, wherein step (a) comprises adding to the whey a whey-soluble zinc salt selected from the group consisting of zinc chloride, zinc acetate, and zinc gluconate.

14. The method of claim 10, comprising performing steps (a) and (b) at a temperature of from about 15° C. to about 50° C.

15. The method of claim 10, comprising performing steps (a) and (b) at a temperature of from about 30° C. to about 40° C.

* * * * *